United States Patent
Chen et al.

(10) Patent No.: US 11,733,369 B2
(45) Date of Patent: Aug. 22, 2023

(54) METHODS AND SYSTEMS FOR THREE DIMENSIONAL OBJECT DETECTION AND LOCALIZATION

(71) Applicant: Waymo LLC, Mountain View, CA (US)

(72) Inventors: Xu Chen, Mountain View, CA (US); Hang Zhao, Mountain View, CA (US); Ruichi Yu, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 248 days.

(21) Appl. No.: 17/173,818

(22) Filed: Feb. 11, 2021

(65) Prior Publication Data
US 2023/0143433 A1    May 11, 2023

(51) Int. Cl.
*G01S 13/86*    (2006.01)
*G01S 13/931*    (2020.01)
(Continued)

(52) U.S. Cl.
CPC ........... *G01S 13/867* (2013.01); *B60W 30/08* (2013.01); *G01S 7/417* (2013.01); *G01S 13/86* (2013.01);
(Continued)

(58) Field of Classification Search
CPC ........ G01S 13/86; G01S 13/867; G01S 13/89; G01S 13/931
See application file for complete search history.

(56) References Cited

U.S. PATENT DOCUMENTS

| | | | | |
|---|---|---|---|---|
| 6,492,935 B1 * | 12/2002 | Higuchi | ................ | G01S 13/867 342/54 |
| 7,979,173 B2 * | 7/2011 | Breed | ..................... | G01S 17/86 701/23 |

(Continued)

FOREIGN PATENT DOCUMENTS

| | | |
|---|---|---|
| WO | 2017157967 A1 | 9/2017 |
| WO | 2019125747 A1 | 6/2019 |
| WO | 2020261823 A1 | 12/2020 |

OTHER PUBLICATIONS

Gao et al., "Object Classification Using CNN-Based Fusion of Vision and LIDAR in Autonomous Vehicle Environment", IEEE Transactions on Industrial Informatics; vol. 14, No. 9; pp. 4224-4231; Date of Publication: Apr. 2018; https://ieeexplore.ieee.org/abstract/document/8331162.

*Primary Examiner* — Peter M Bythrow
(74) *Attorney, Agent, or Firm* — McDonnell Boehnen Hulbert & Berghoff LLP

(57) ABSTRACT

Example embodiments relate to techniques for three dimensional (3D) object detection and localization. A computing system may cause a radar unit to transmit radar signals and receive radar reflections relative to an environment of a vehicle. Based on the radar reflections, the computing system may determine a heading and a range for a nearby object. The computing system may also receive an image depicting a portion of the environment that includes the object from a vehicle camera and remove peripheral areas of the image to generate an image patch that focuses upon the object based on the heading and the range for the object. The image patch and the heading and the range for the object can be provided as inputs into a neural network that provides output parameters corresponding to the object, which can be used to control the vehicle.

15 Claims, 13 Drawing Sheets

(51) Int. Cl.
  *G01S 13/89* (2006.01)
  *G06T 7/70* (2017.01)
  *B60W 30/08* (2012.01)
  *G01S 7/41* (2006.01)

(52) U.S. Cl.
  CPC ............ *G01S 13/89* (2013.01); *G01S 13/931* (2013.01); *G06T 7/70* (2017.01); *B60W 2420/42* (2013.01); *B60W 2420/52* (2013.01); *B60W 2554/00* (2020.02); *B60W 2754/10* (2020.02); *G01S 2013/93271* (2020.01); *G06T 2207/10024* (2013.01); *G06T 2207/10028* (2013.01); *G06T 2207/20084* (2013.01); *G06T 2207/30252* (2013.01)

(56) References Cited

U.S. PATENT DOCUMENTS

| | | | |
|---|---|---|---|
| 8,050,863 B2 | 11/2011 | Trepagnier | |
| 8,139,109 B2* | 3/2012 | Schmiedel | G01S 17/86 |
| | | | 348/148 |
| 8,199,046 B2* | 6/2012 | Nanami | G01S 13/867 |
| | | | 342/52 |
| 8,948,501 B1 | 2/2015 | Kim | |
| 9,494,935 B2* | 11/2016 | Okumura | B60W 30/00 |
| 9,720,415 B2 | 8/2017 | Levinson | |
| 9,989,964 B2* | 6/2018 | Berntorp | G05B 13/027 |
| 10,690,770 B2 | 6/2020 | Rosenblum | |
| 2008/0231702 A1* | 9/2008 | Matsumoto | B60R 1/00 |
| | | | 348/148 |
| 2012/0101680 A1 | 4/2012 | Trepagnier | |
| 2016/0061935 A1 | 3/2016 | McCloskey | |
| 2017/0323179 A1 | 11/2017 | Vallespi-Gonzalez | |
| 2018/0089563 A1* | 3/2018 | Redding | B60W 30/00 |
| 2018/0330615 A1* | 11/2018 | Yamanaka | G08G 1/16 |
| 2019/0096086 A1* | 3/2019 | Xu | G06K 9/629 |
| 2019/0258878 A1* | 8/2019 | Koivisto | G06V 10/762 |
| 2019/0291726 A1 | 9/2019 | Shavlev-Shwartz | |
| 2020/0019165 A1* | 1/2020 | Levandowski | G06T 7/593 |
| 2020/0064444 A1* | 2/2020 | Regani | G01S 7/006 |
| 2020/0148203 A1 | 5/2020 | Taniguchi | G06T 1/00 |
| 2020/0156651 A1* | 5/2020 | Golov | B60W 50/029 |
| 2020/0202168 A1 | 6/2020 | Mao | G06K 9/6257 |
| 2020/0250553 A1* | 8/2020 | Tomaru | G01S 17/06 |
| 2020/0272148 A1* | 8/2020 | Karasev | G01S 13/867 |
| 2020/0302662 A1* | 9/2020 | Homayounfar | G06V 10/803 |
| 2020/0410261 A1* | 12/2020 | Mishra | G06K 9/6292 |
| 2021/0117659 B2 | 4/2021 | Foroozan | G01S 13/867 |
| 2021/0117701 A1* | 4/2021 | Janardhana | G06V 10/764 |
| 2021/0286923 A1* | 9/2021 | Kristensen | G06F 30/27 |
| 2022/0036043 A1* | 2/2022 | Sakashita | G01S 17/89 |
| 2022/0128657 A1* | 4/2022 | Kale | G01S 13/867 |
| 2022/0180131 A1* | 6/2022 | Oblak | G06V 10/809 |
| 2022/0230444 A1* | 7/2022 | Edo | G06V 10/25 |

* cited by examiner $$
\begin{bmatrix} 0 & 0 & 1 & 0 & 0 \\ 0 & 1 & 1 & 1 & 0 \\ 1 & 1 & 1 & 1 & 1 \\ 1 & 1 & 0 & 0 & 1 \\ 1 & 0 & 0 & 0 & 0 \end{bmatrix} * \begin{bmatrix} 1 & 0 & 1 \\ 0 & 1 & 0 \\ 1 & 0 & 1 \end{bmatrix} = \begin{bmatrix} 4 & 3 & 4 \\ 3 & 4 & 3 \\ 4 & 2 & 2 \end{bmatrix}
$$

520 → (left matrix), 522 → (middle matrix), 524 → (right matrix)

Figure 5B

METHODS AND SYSTEMS FOR THREE DIMENSIONAL OBJECT DETECTION AND LOCALIZATION

BACKGROUND

An autonomous vehicle can be described as a vehicle that is capable of sensing the surrounding environment and moving safely with little or no human input. To sense the environment, a vehicle may be equipped with a sensor system that can include several different types of sensors, such as image capture systems (e.g., cameras), radars, and/or light detection and ranging (LIDAR or Lidar) systems. Advanced control systems can interpret sensory information to identify appropriate navigation paths, as well as obstacles and relevant signage. By measuring the environment during navigation, autonomous vehicles can perform various services, such as passenger and cargo transportation.

SUMMARY

Example embodiments describe techniques for three dimensional (3D) object detection and localization. A computing system assisting with autonomous or semi-autonomous vehicle navigation may perform 3D object detection and localization techniques herein to leverage vehicle cameras and radar to identify and localize objects in the surrounding environment. By performing a 3D object detection and localization technique, the computing device can enable the vehicle to understand and safely navigate the surrounding environment.

In one aspect, an example method is provided. The method involves causing, by a computing system, a radar unit to transmit radar signals into an environment of a vehicle and receiving, at the computing system, radar reflections that represent reflections of the radar signals. The method further involves determining a heading and a range for an object positioned in the environment based on the radar reflections. The range represents a distance between the object and the vehicle. The method also involves receiving, at the computing system and from a vehicle camera, an image depicting a portion of the environment that includes the object and removing peripheral areas of the image to generate an image patch that focuses upon the object based on the heading and the range for the object. The method also involves providing the image patch and the heading and the range for the object as inputs into a neural network such that the neural network provides output parameters corresponding to the object and controlling the vehicle based on the output parameters corresponding to the object.

In another aspect, an example system is provided. The system includes a vehicle, a radar unit coupled to the vehicle, a vehicle camera, and a computing device. The computing device is configured to cause the radar unit to transmit radar signals into an environment of the vehicle and receive radar reflections that represent reflections of the radar signals. Based on the radar reflections, the computing device is configured to determine a heading and a range for an object positioned in the environment. The range represents a distance between the object and the vehicle. The computing device is also configured to receive, from the vehicle camera, an image depicting a portion of the environment that includes the object and remove peripheral areas of the image to generate an image patch that focuses upon the object based on the heading and the range for the object. The computing device is also configured to provide the image patch and the heading and the range for the object as inputs into a neural network such that the neural network provides output parameters corresponding to the object. The computing device is further configured to control the vehicle based on the output parameters corresponding to the object.

In yet another example, an example non-transitory computer readable medium having stored therein program instructions executable by a computing system to cause the computing system to perform functions is provided. The functions involve causing a radar unit to transmit radar signals into an environment of a vehicle, receiving radar reflections that represent reflections of the radar signals, and determining a heading and a range for an object positioned in the environment based on the radar reflections. The range represents a distance between the object and the vehicle. The functions also involve receiving, from a vehicle camera, an image depicting a portion of the environment that includes the object and removing peripheral areas of the image to generate an image patch that focuses upon the object based on the heading and the range for the object. The functions further involve providing the image patch and the heading and the range for the object as inputs into a neural network such that the neural network provides output parameters corresponding to the object and providing control instructions for the vehicle based on the output parameters corresponding to the object.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5B depicts a convolution, according to one or more example embodiments.

DETAILED DESCRIPTION

Figure 1:
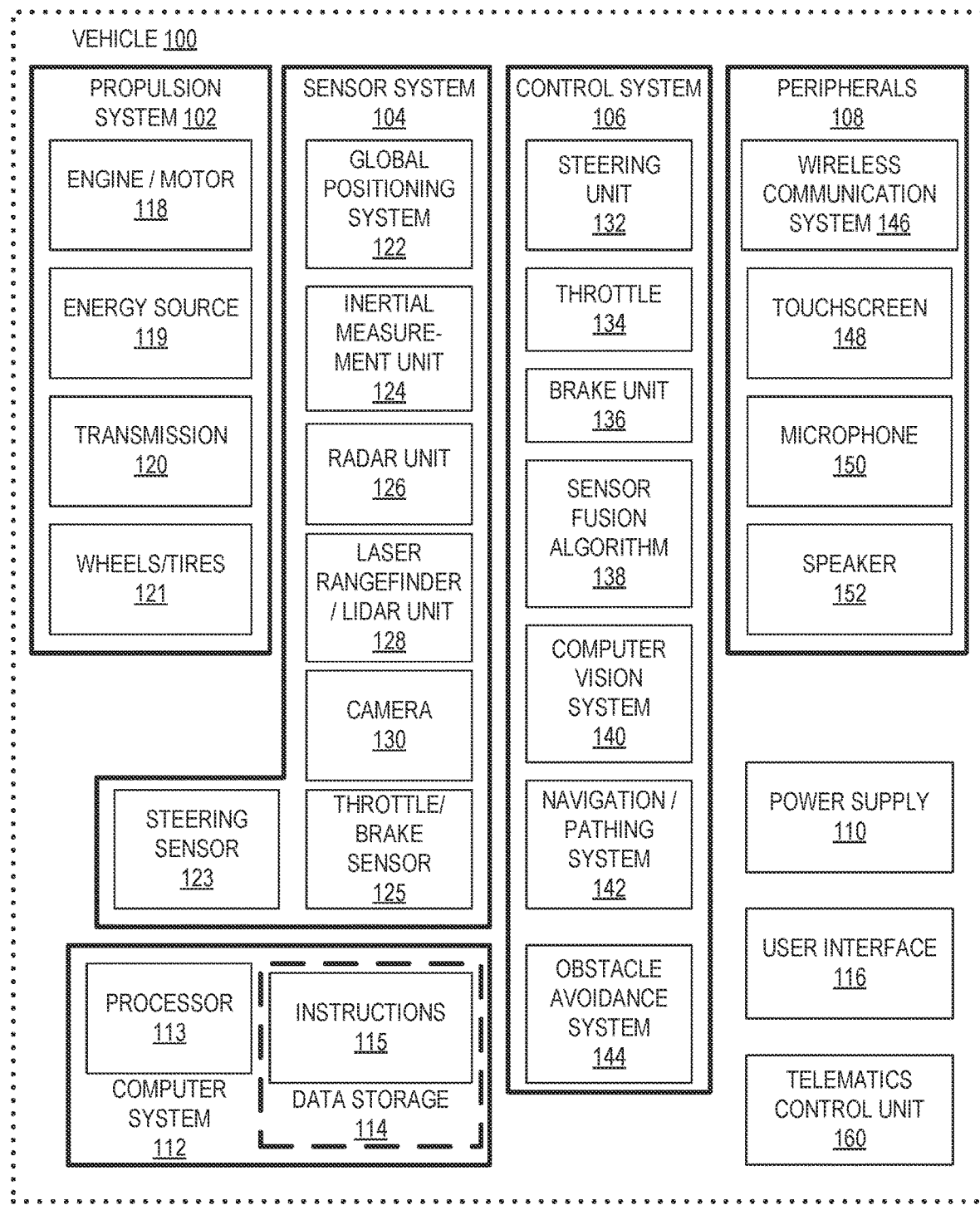
FIG. 1 is a functional block diagram illustrating a vehicle, according to one or more example embodiments.
Figure 2A:
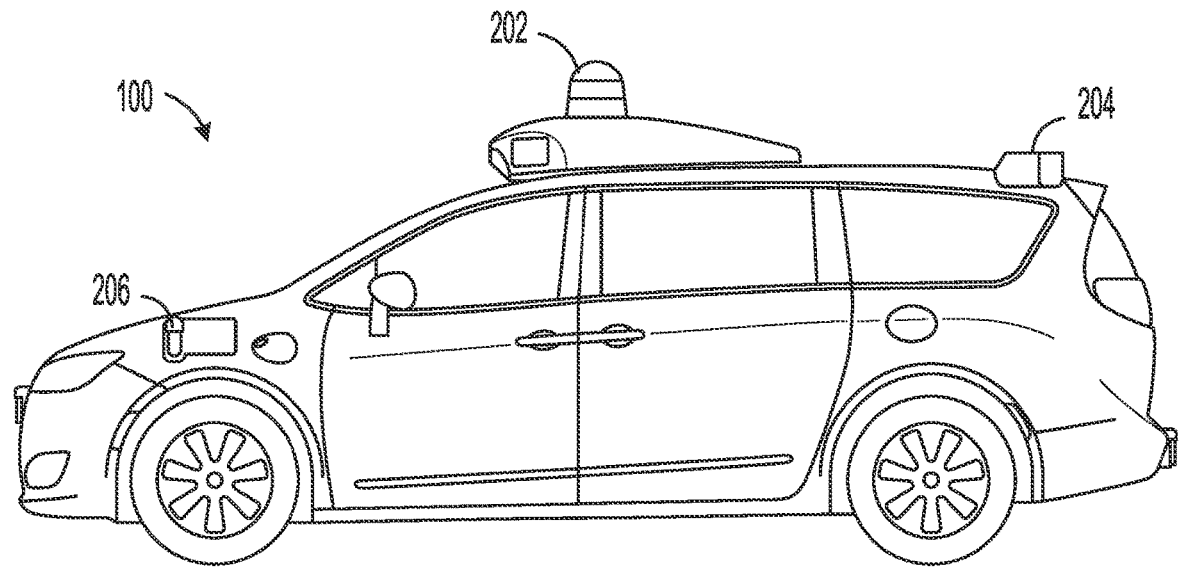
FIG. 2A illustrates a side view of a vehicle, according to one or more example embodiments.
Figure 2B:
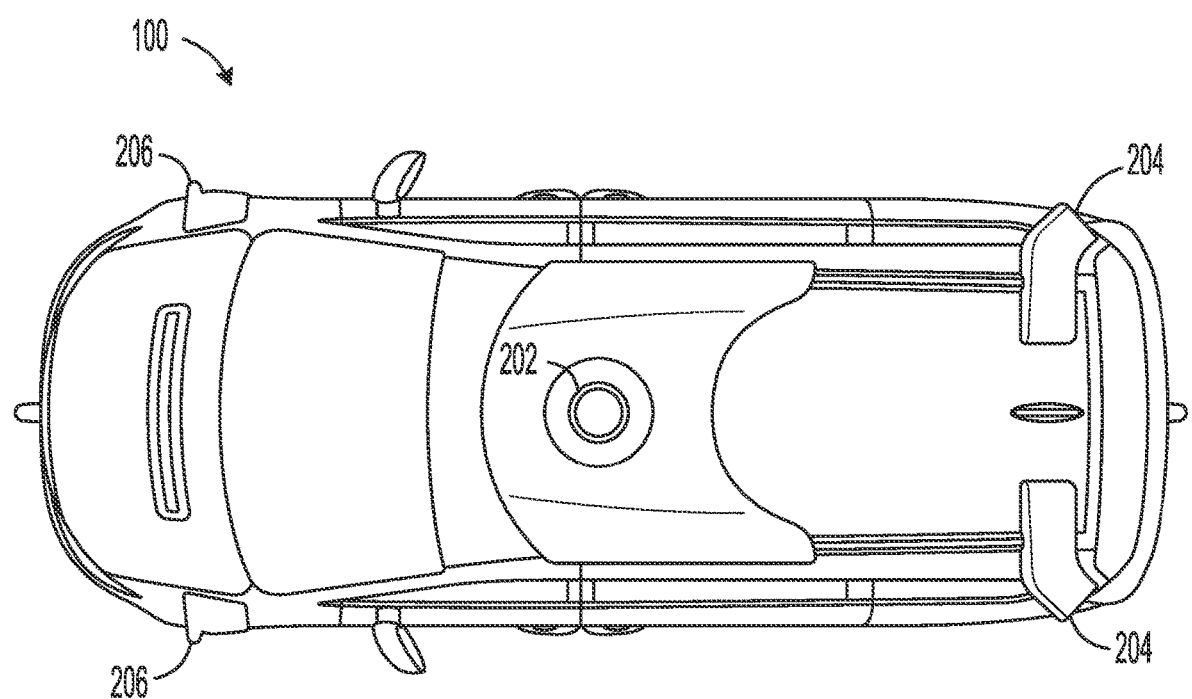
FIG. 2B illustrates a top view of a vehicle, according to one or more example embodiments.
Figure 2C:
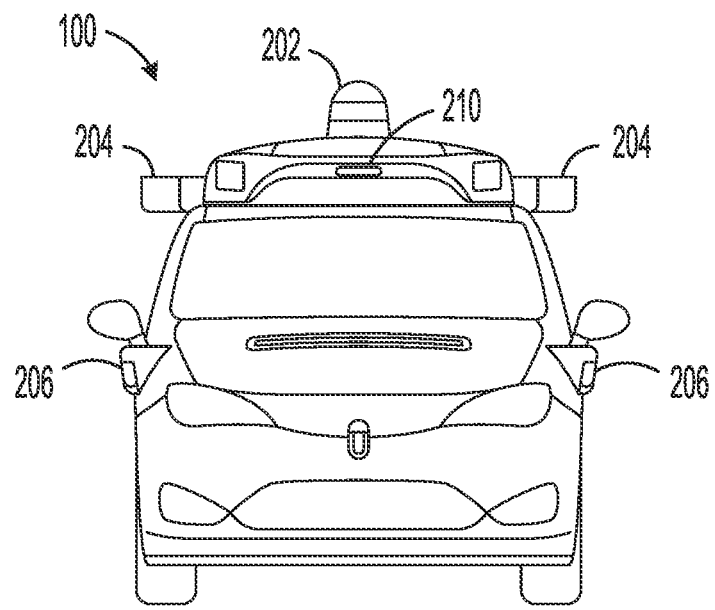
FIG. 2C illustrates a front view of a vehicle, according to one or more example embodiments.
Figure 2D:
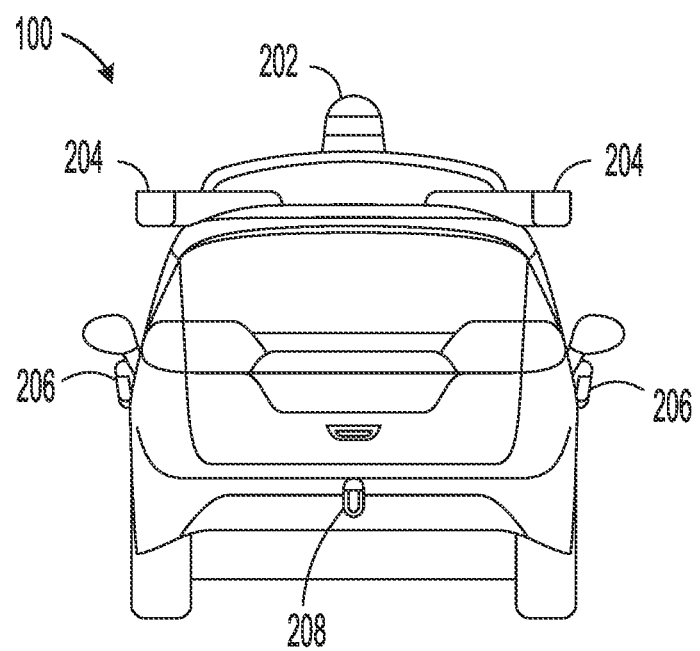
FIG. 2D illustrates a back view of a vehicle, according to one or more example embodiments.
Figure 2E:
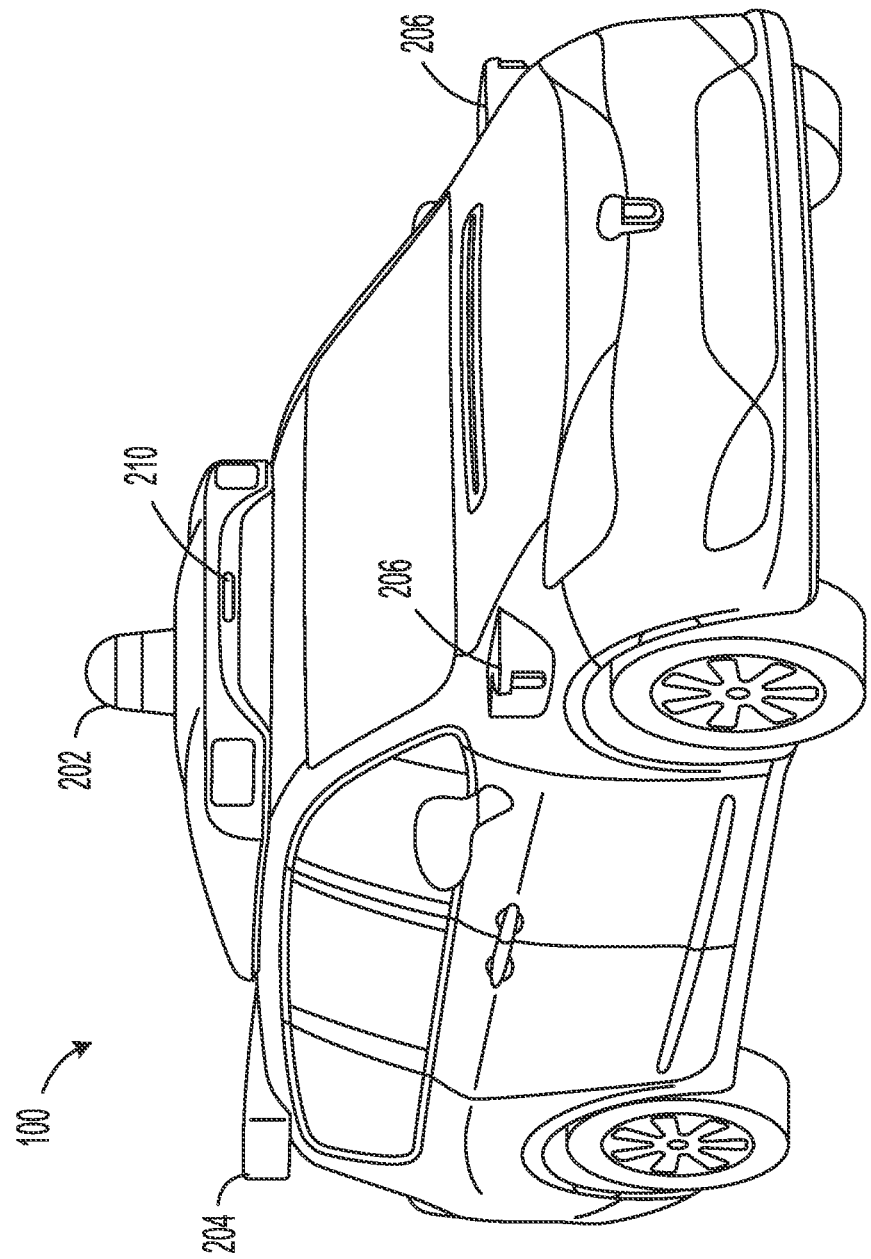
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Vehicles are increasingly incorporating sensor systems that include a combination of sensors and computational resources that can be used to understand and navigate autonomously or semi-autonomously through surrounding environments. In particular, the vehicle sensor system can use the combination of sensors and processing devices to measure and understand the environment to determine and execute control strategies. The sensor system can enable the vehicle to detect objects and other information needed in order to drive safely. During operation, sensor data can be processed and analyzed to develop and navigate paths between destinations and to produce control instructions for vehicle systems to execute, such as steering, acceleration, and braking.

Vehicle sensor systems often include cameras (image sensors) that can capture images and video to enable the vehicle to see and interpret objects in the road just like human drivers do with their eyes. In some instances, a vehicle may include multiple cameras positioned strategically on the vehicle to enable the camera system to enable a 360 degree view of the vehicle's surrounding environment, which can provide a broader picture of the traffic conditions around the vehicle. The cameras can capture and provide images that enable computing devices to detect objects, potentially classify the objects, and estimate distances between the objects and the vehicle.

In some instances, however, the images and/or videos captured by vehicle cameras individually may not provide enough information to accurately estimate the distance between an object and the vehicle. Sensor systems that primarily depend on cameras for object detection may provide accurate dimension information, but obtain inaccurate depth information in some cases.

Vehicle sensor systems can also include a radar system, which can use one or more antennas (radiating elements) to emit radar signals to measure the surrounding environment. Upon coming into contact with surfaces in the environment, radar signals can scatter in multiple directions with some radar signals penetrating into some surfaces while other radar signals reflect off surfaces and travel back towards reception antennas of the vehicle radar system. A radar processing system (e.g., a computing device or another type of processing unit) may process the radar reflections to generate two dimensional (2D) and/or three dimensional (3D) measurements that represent aspects of the environment, such as the positions, orientations, and movements of nearby objects and other surfaces occupying the environment near the radar system.

Because a radar system can be used to measure distances and motions of nearby objects and other surfaces, vehicles are increasingly incorporating vehicle radar systems to generate measurements during navigation that can assist with vehicle navigation, obstacle avoidance, and in other ways that can boost overall vehicle safety. For instance, a vehicle may use radar to detect and identify the positions, orientations, and movements of nearby vehicles, bicycles, pedestrians, and animals. Radar can also reveal information about other features in the vehicle's surrounding environment, such as the location, arrangement, and position of road boundaries, road conditions (e.g., smooth or bumpy surfaces), weather conditions (e.g., wet or snowy roadways), and the position of traffic signs and signals.

Example embodiments presented herein relate to 3D object detection and localization techniques that leverage deep learning. Particularly, a system may train and use a neural network (or multiple networks) to assist a vehicle sensor system with object detection and localization. The trained neural network can increase the vehicle's understanding of the surrounding environment by efficiently combining the benefits of data from different types of sensors and producing outputs that help vehicle systems identify, classify, and localize objects in the environment as the vehicle navigates.

Some example 3D object detection and localization techniques involve using combinations of images from vehicle cameras and radar data obtained by the vehicle radar system. By way of an example, a sensor computing device or another processing unit in communication with vehicle sensors may initially cause a radar unit to transmit radar signals, which enables the subsequent reception of radar reflections that bounce off surfaces in the vehicle's environment. The computing device may use these radar reflections to detect objects nearby the vehicle and also determine information about these objects, such as the heading and the range for objects. The range may specify the distance between the object and the vehicle, which can change as the vehicle navigates. The heading may indicate an orientation of the object relative to the vehicle.

In addition to these radar measurements, the computing device may also obtain images from one or more vehicle cameras. Cameras strategically positioned to or on the vehicle can capture images that depict portions of the surrounding environment that overlaps the portions measured via radar. In some instances, the computing device may receive images from a camera that capture the portion of the environment that is occupied by an object, person, or another type of surface detected within radar measurements. For an image depicting an area of the surrounding environment that contains a detected object, the computing device may use radar measurements to crop the image to focus upon the detected object. For instance, the computing device may use the heading and the range determined for a particular object based on radar reflections to crop an image to isolate the particular object. By cropping the image, the computing device can create an image patch that focuses upon the object and contains less pixels total, which can reduce processing time and computational resources needed to extract information from an image patch relative to the complete image.

The computing device may input the image patch depicting some surface of interest (e.g., an object) and the heading and the range for the same surface of interest as indicated by radar measurements into a neural network, which may be trained to use these inputs to produce output parameters that describe the surface of interest in a manner that can assist with autonomous operations. For instance, the output parameters may include a classification for the object, which can involve assigning one or more labels to the object that can be leveraged to determine control techniques for the vehicle that factor these labels. Example classifications may indicate that a surface corresponds to a roadway element or boundary, sign, another vehicle, a cyclist, semi-truck trailer, and/or pedestrian. The classification can indicate that the surface is another type of structure in some instances. As such, the identification and classification can help vehicle control systems determine how to proceed with respect to the object as well as other objects in the environment. The output parameters produced by the neural network can also indicate 3D parameters for an object, such as a center of the object and dimensions for the object from the perspective of the vehicle. The 3D parameters can be used to accurately localize the object relative to the vehicle, including indicating a distance between the object and the vehicle.

The neural network can use image patches and corresponding radar measurements to identify and localize various surfaces and objects as the vehicle navigates. By iteratively performing this technique using new images and radar measurements received as the vehicle navigates, the computing device can obtain 3D information that represents the environment and assists with development of the navigation strategy for the vehicle. The computing device or another control system can use the 3D information to avoid potential obstacles, detect traffic signals, road boundaries, and perform other actions that can enable the vehicle to safely navigate between destinations.

In some embodiments, example techniques can be performed with sensor data from other types of sensors (e.g., LIDAR). In some instances, radar may provide sparse data that can be used to map the environment more effectively than these sensors. Particularly, radar data can provide information useful for depth and heading estimations that can supplement the size and shape information derived from one or more images (e.g., video) from cameras. Thus, a system may be configured to use other sensors when radar is unavailable and/or to supplement radar.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some example embodiments, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., $O_2$ monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include processor 113 (which could include at least one microprocessor or at least one processor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on or within vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radar units, LIDAR units, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
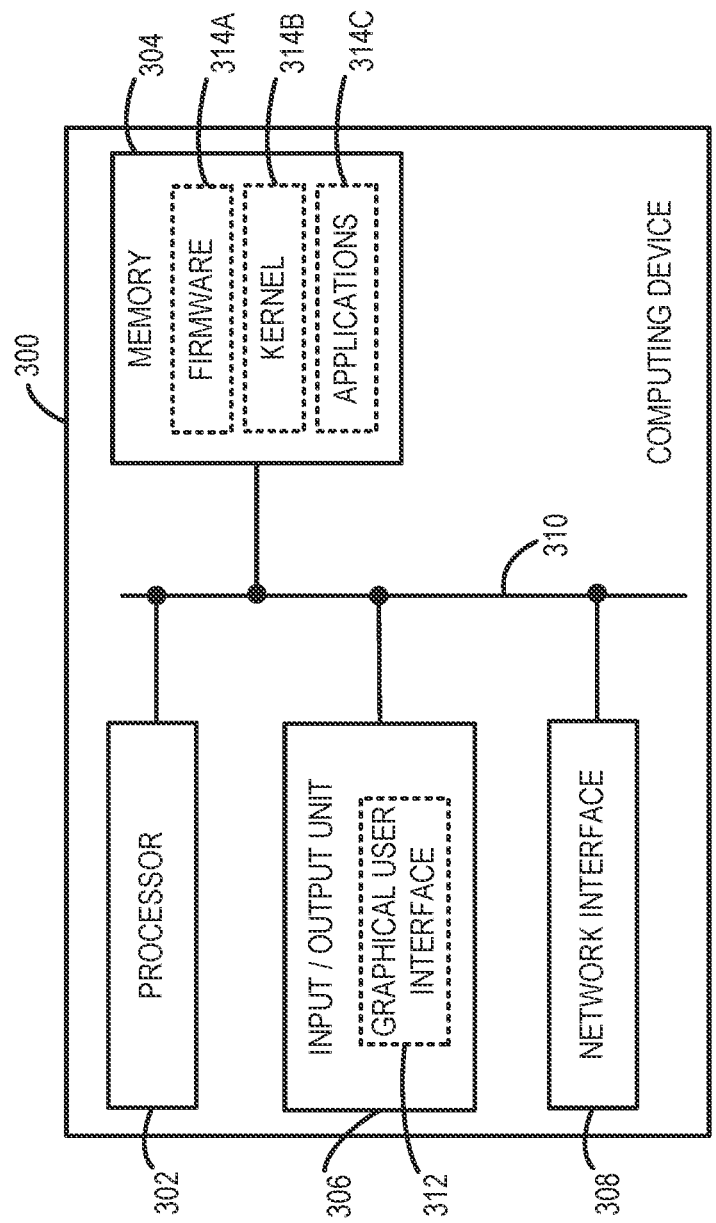
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. A vehicle may use computing device 300 to perform 3D object detection and localization to measure the surrounding environment.

Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104, develop control instructions, enable wireless communication with other devices, and/or perform other operations. Alternatively, computing device 300 can be located remotely from vehicle 100 and communicate via secure wireless communication. In some examples, computing device 300 may operate as a remotely positioned device that a remote human operator can use to communicate with one or more vehicles.

In the example embodiment shown in FIG. 3, computing device 300 includes processor 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processor 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be one or more single-core processors. In other cases, processor 302 may be one or more multi-core processors with multiple independent processing units. Processor 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples. Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processor 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more user-space software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may be displayable one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations.

In some embodiments, computing device 300 may enable deep learning operations to be performed herein. For instance, computing device 300 can be used to train a neural network to perform operations presented herein. Computing device 300 may also use the trained neural network to perform operations presented herein. In some examples, computing device 300 may include multiple components (e.g., processor 302) that enables development and/or performance of neural networks.

To further illustrate, an artificial neural network (ANN) is a computational model in which a number of simple units, working individually in parallel and without central control, can combine to solve complex problems. An ANN is represented as a number of nodes that are arranged into a number of layers, with connections between the nodes of adjacent layers.

Figure 4A:
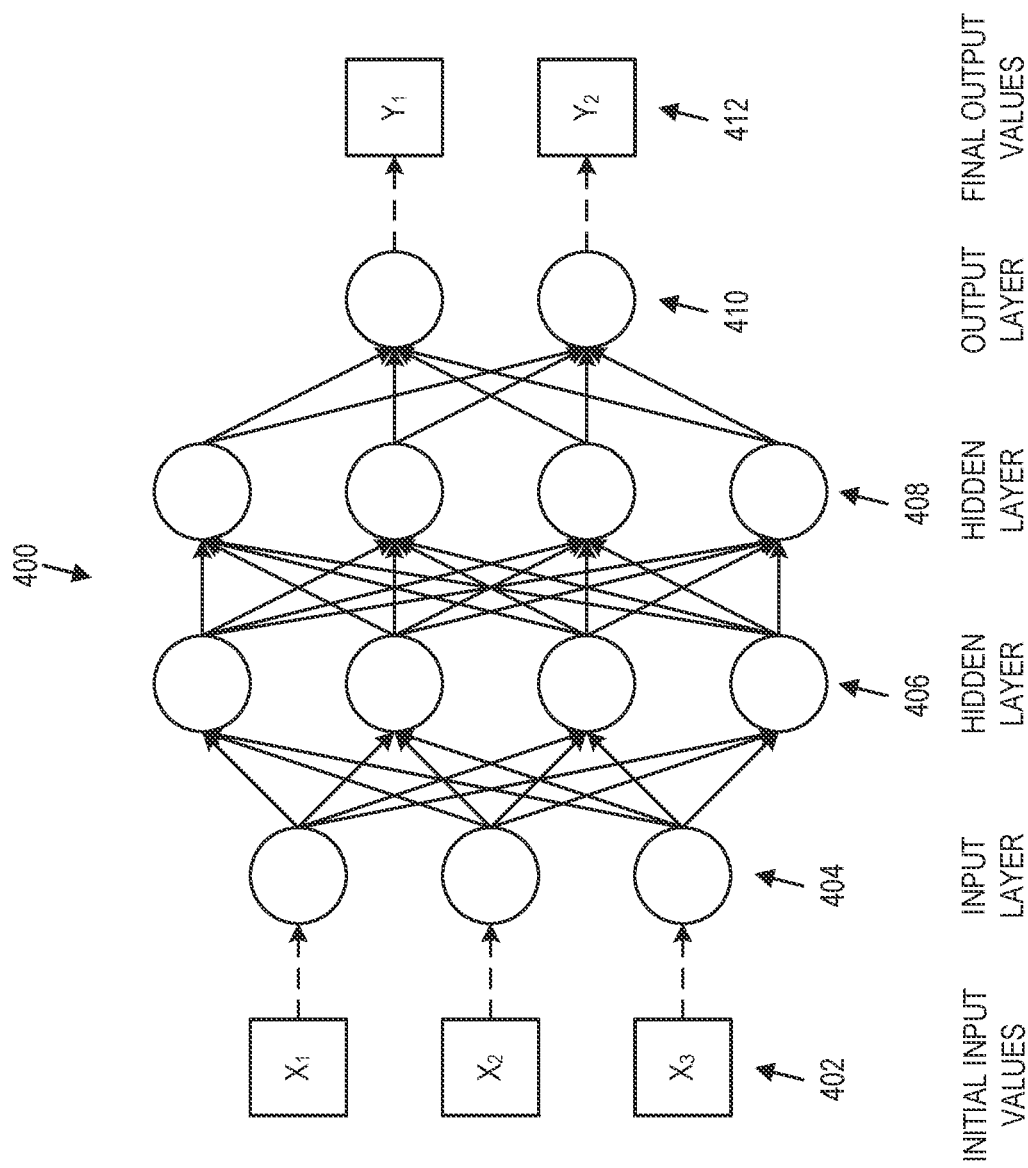
FIG. 4A depicts an artificial neural network (ANN) architecture, according to one or more example embodiments.

FIG. 4A depicts ANN 400, according to one or more examples. ANN 400 represents a feed-forward multilayer neural network, but similar structures and principles are used in convolution neural networks (CNNs), recurrent neural networks, and recursive neural networks, for example. ANN 400 can be trained to perform particular tasks, such as image processing techniques (e.g., segmentation, semantic segmentation, image enhancements) or the 3D object detection techniques described herein. In further examples, ANN 400 can learn to perform other tasks, such as computer vision, risk evaluation, etc.

As shown in FIG. 4A, ANN 400 consists of four layers: input layer 404, hidden layer 406, hidden layer 408, and output layer 410. The three nodes of input layer 404 respectively receive $X_1$, $X_2$, and $X_3$ as initial input values 402. The two nodes of output layer 410 respectively produce $Y_1$ and $Y_2$ as final output values 412. As such, ANN 400 is a fully-connected network, in that nodes of each layer aside from input layer 404 receive input from all nodes in the previous layer. In some examples, initial input values 402 may correspond to an image patch depicting an object and the heading and the range for the same object as represented within radar measurements and final output values 412 may represent a classification and 3D parameters for the object.

The solid arrows between pairs of nodes represent connections through which intermediate values flow, and are each associated with a respective weight that is applied to the respective intermediate value. Each node performs an operation on its input values and their associated weights (e.g., values between 0 and 1, inclusive) to produce an output value. In some cases this operation may involve a dot-product sum of the products of each input value and associated weight. An activation function may be applied to the result of the dot-product sum to produce the output value. Other operations are possible.

For example, if a node receives input values $\{x_1, x_2, \ldots, x_n\}$ on n connections with respective weights of $\{w_1, w_2, \ldots w_n\}$, the dot-product sum d may be determined as:

$$d = \sum_{i=1}^{n} x_i w_i + b \qquad (1)$$

Where b is a node-specific or layer-specific bias.

Notably, the fully-connected nature of ANN 400 can be used to effectively represent a partially-connected ANN by giving one or more weights a value of 0. Similarly, the bias can also be set to 0 to eliminate the b term.

An activation function, such as the logistic function, may be used to map d to an output value y that is between 0 and 1, inclusive:

$$y = \frac{1}{1 + e^{-d}} \qquad (2)$$

Functions other than the logistic function, such as the sigmoid or tanh functions, may be used instead.

Then, y may be used on each of the node's output connections, and will be modified by the respective weights thereof. In ANN 400, the input values and weights are applied to the nodes of each layer, from left to right until final output values 412 are produced. If ANN 400 has been fully trained, final output values 412 are a proposed solution to the problem that ANN 400 has been trained to solve. In order to obtain a meaningful, useful, and reasonably accurate solution, ANN 400 requires at least some extent of training.

Training ANN 400 may involve providing some form of supervisory training data, namely sets of input values and desired, or ground truth, output values. For example, supervisory training may enable an ANN to perform non-semantic tasks, which can involve providing training datasets to determine desired representations. For ANN 400, this training data may include m sets of input values paired with output values. More formally, the training data may be represented as:

$$\{X_{1,i}, X_{2,i}, X_{3,i}, \widehat{Y_{1,i}}, \widehat{Y_{2,i}}\} \qquad (3)$$

where i=1 . . . m, and $\widehat{Y_{1,i}}$ and $\widehat{Y_{2,i}}$ are the desired output values for the input values of $X_{1,i}$, $X_{2,i}$, and $X_{3,i}$.

The training process involves applying the input values from such a set to ANN 400 and producing associated output values. A loss function can be used to evaluate the error between the produced output values and the ground truth output values. In some instances, this loss function may be a sum of differences, mean squared error, or some other metric. In some cases, error values are determined for all of the m sets, and the error function involves calculating an aggregate (e.g., an average) of these values.

Once the error is determined, the weights on the connections are updated in an attempt to reduce the error. In simple terms, this update process should reward "good" weights and penalize "bad" weights. Thus, the updating should distribute the "blame" for the error through ANN 400 in a fashion that results in a lower error for future iterations of the training data. For example, the update process can involve modifying at least one weight of ANN 400 such that subsequent applications of ANN 400 on training data generates new outputs that more closely match the ground truth masks that correspond to the training data.

The training process continues applying the training data to ANN 400 until the weights converge. Convergence occurs when the error is less than a threshold value or the change in the error is sufficiently small between consecutive iterations of training. At this point, ANN 400 is said to be "trained" and can be applied to new sets of input values in order to predict output values that are unknown. When trained to perform image processing techniques, ANN 400 may produce outputs of input images that closely resemble ground truths (i.e., desired results) created for the input images. In some embodiments, when trained to perform 3D object detection and localization, ANN 400 may generate outputs that indicate classifications and 3D parameters for various objects and surfaces in an environment.

Many training techniques for ANNs make use of some form of backpropagation. During backpropagation, input signals are forward-propagated through the network the outputs, and network errors are then calculated with respect to target variables and back-propagated backwards towards the inputs. Particularly, backpropagation distributes the error one layer at a time, from right to left, through ANN 400. Thus, the weights of the connections between hidden layer 408 and output layer 410 are updated first, the weights of the connections between hidden layer 406 and hidden layer 408 are updated second, and so on. This updating is based on the derivative of the activation function.

Figure 4B:
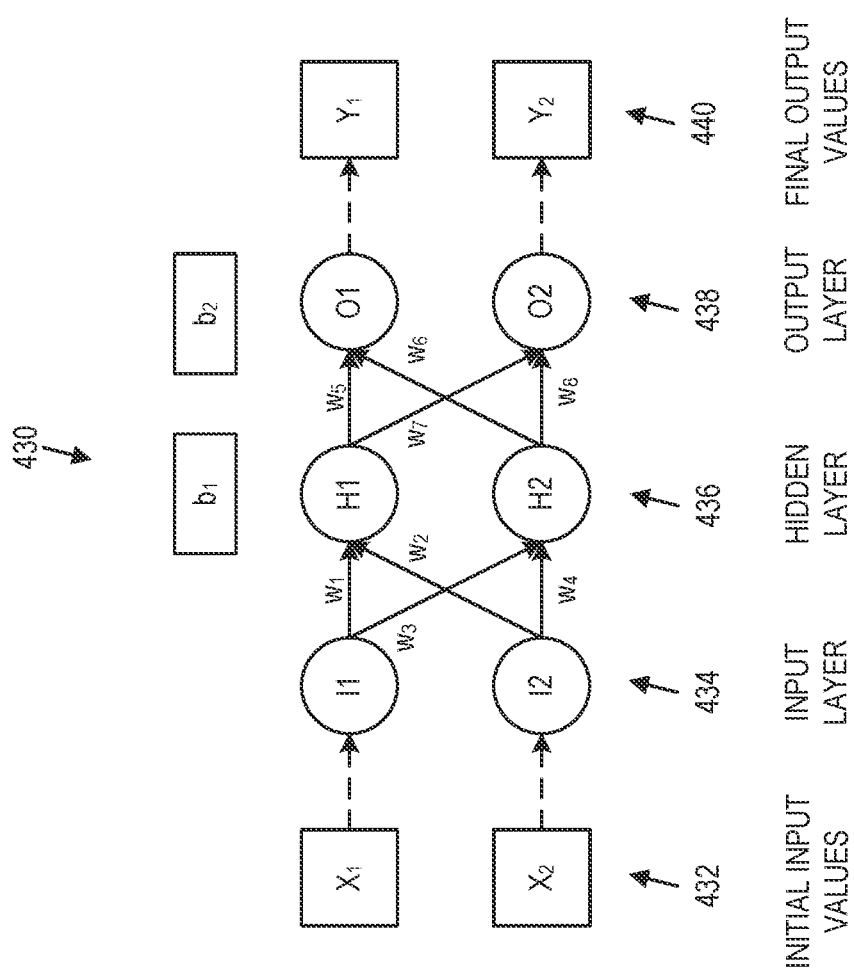
FIG. 4B depicts training the ANN, according to one or more example embodiments.

In order to further explain error determination and backpropagation, it is helpful to look at an example of the process in action. However, backpropagation can become quite complex to represent except on the simplest of ANNs. Therefore, FIG. 4B depicts a very simple ANN 430 in order to provide an illustrative example of backpropagation.

| Weight | Nodes |
|---|---|
| $w_1$ | I1, H1 |
| $w_2$ | I2, H1 |
| $w_3$ | I1, H2 |

| Weight | Nodes |
| --- | --- |
| $w_4$ | I2, H2 |
| $w_5$ | H1, O1 |
| $w_6$ | H2, O1 |
| $w_7$ | H1, O2 |
| $w_8$ | H2, O2 |

ANN 430 consists of three layers, input layer 434, hidden layer 436, and output layer 438, each having two nodes. Initial input values 432 are provided to input layer 434, and output layer 438 produces final output values 440. Weights have been assigned to each of the connections and biases (e.g., $b_1$, $b_2$ shown in FIG. 4B) may also apply to the net input of each node in hidden layer 436 in some examples. For clarity, Table 1 maps weights to pairs of nodes with connections to which these weights apply. As an example, $w_2$ is applied to the connection between nodes I2 and H1, $w_7$ is applied to the connection between nodes H1 and O2, and so on.

The goal of training ANN 430 is to update the weights over some number of feed forward and backpropagation iterations until the final output values 440 are sufficiently close to designated desired outputs. Note that use of a single set of training data effectively trains ANN 430 for just that set. If multiple sets of training data are used, ANN 430 will be trained in accordance with those sets as well.

To initiate the feed forward pass, net inputs to each of the nodes in hidden layer 436 are calculated. From the net inputs, the outputs of these nodes can be found by applying the activation function. For node H1, the net input $net_{H1}$ is:

$$net_{H1} = w_1 X_1 + w_2 X_2 + b_1 \qquad (4)$$

Applying the activation function (here, the logistic function) to this input determines that the output of node H1, $out_{H1}$ is:

$$out_{H1} = \frac{1}{1 + e^{-net_{H1}}} \qquad (5)$$

Following the same procedure for node H2, the output $out_{H2}$ can also be determined. The next step in the feed forward iteration is to perform the same calculations for the nodes of output layer 438. For example, net input to node O1, $net_{O1}$ is:

$$net_{O1} = w_5 out_{H1} + w_6 out_{H2} + b_2 \qquad (6)$$

Thus, output for node O1, $out_{O1}$ is:

$$out_{O1} = \frac{1}{1 + e^{-net_{O1}}} \qquad (7)$$

Following the same procedure for node O2, the output $out_{O2}$ can be determined. At this point, the total error, $\Delta$, can be determined based on a loss function. For instance, the loss function can be the sum of the squared error for the nodes in output layer 408. In other words:

$$\Delta = \Delta_{O1} + \Delta_{O2} = \frac{1}{2}(out_{O1} - \hat{Y}_1)^2 + \frac{1}{2}(out_{O2} - \hat{Y}_2)^2 \qquad (8)$$

The multiplicative constant $$\frac{1}{2}$$

in each term is used to simplify differentiation during backpropagation. Since the overall result is scaled by a learning rate anyway, this constant does not negatively impact the training. Regardless, at this point, the feed forward iteration completes and backpropagation begins.

As noted above, a goal of backpropagation is to use $\Delta$ (i.e., the total error determined based on a loss function) to update the weights so that they contribute less error in future feed forward iterations. As an example, consider the weight $w_5$. The goal involves determining how much the change in $w_5$ affects $\Delta$. This can be expressed as the partial derivative $$\frac{\partial \Delta}{\partial w_5}.$$

Using the chain rule, this term can be expanded as:

$$\frac{\partial \Delta}{\partial w_5} = \frac{\partial \Delta}{\partial out_{O1}} \times \frac{\partial out_{O1}}{\partial net_{O1}} \times \frac{\partial net_{O1}}{\partial w_5} \qquad (9)$$

Thus, the effect on $\Delta$ of change to $w_5$ is equivalent to the product of (i) the effect on $\Delta$ of change to $out_{O1}$, (ii) the effect on $out_{O1}$ of change to $net_{O1}$, and (iii) the effect on $net_{O1}$ of change to $w_5$. Each of these multiplicative terms can be determined independently. Intuitively, this process can be thought of as isolating the impact of $w_5$ on $net_{O1}$, the impact of $net_{O1}$ on $out_{O1}$, and the impact of $out_{O1}$ on $\Delta$.

This process can be repeated for the other weights feeding into output layer 438. Note that no weights are updated until the updates to all weights have been determined at the end of backpropagation. Then, all weights are updated before the next feed forward iteration.

After updates to the remaining weights, $w_1$, $w_2$, $w_3$, and $w_4$ are calculated, backpropagation pass is continued to hidden layer 436. This process can be repeated for the other weights feeding into output layer 438. At this point, the backpropagation iteration is over, and all weights have been updated. ANN 430 may continue to be trained through subsequent feed forward and backpropagation iterations. In some instances, after over several feed forward and backpropagation iterations (e.g., thousands of iterations), the error can be reduced to produce results that approximate the original desired results. At that point, the values of $Y_1$ and $Y_2$ will be close to the target values. As shown, by using a differentiable loss function, the total error of predictions output by ANN 430 compared to desired results can be determined and used to modify weights of ANN 430 accordingly.

In some cases, an equivalent amount of training can be accomplished with fewer iterations if the hyper parameters of the system (e.g., the biases $b_1$ and $b_2$ and the learning rate a) are adjusted. For instance, setting the learning rate closer to a particular value may result in the error rate being reduced more rapidly. Additionally, the biases can be updated as part of the learning process in a similar fashion to how the weights are updated.

Regardless, ANN 430 is just a simplified example. Arbitrarily complex ANNs can be developed with the number of nodes in each of the input and output layers tuned to address specific problems or goals. Further, more than one hidden layer can be used and any number of nodes can be in each hidden layer.

A convolutional neural network (CNN) is similar to an ANN, in that the CNN can consist of some number of layers of nodes, with weighted connections therebetween and possible per-layer biases. The weights and biases may be updated by way of feed forward and backpropagation procedures discussed above. A loss function may be used to compare output values of feed forward processing to desired output values.

On the other hand, CNNs are usually designed with the explicit assumption that the initial input values are derived from one or more images. In some embodiments, each color channel of each pixel in an image patch is a separate initial input value. Assuming three color channels per pixel (e.g., red, green, and blue), even a small 32×32 patch of pixels will result in 3072 incoming weights for each node in the first hidden layer. Clearly, using a naïve ANN for image processing could lead to a very large and complex model that would take long to train.

Instead, CNNs are designed to take advantage of the inherent structure that is found in almost all images. In particular, nodes in a CNN are only connected to a small number of nodes in the previous layer. This CNN architecture can be thought of as three dimensional, with nodes arranged in a block with a width, a height, and a depth. For example, the aforementioned 32×32 patch of pixels with 3 color channels may be arranged into an input layer with a width of 32 nodes, a height of 32 nodes, and a depth of 3 nodes.

Figure 5A:
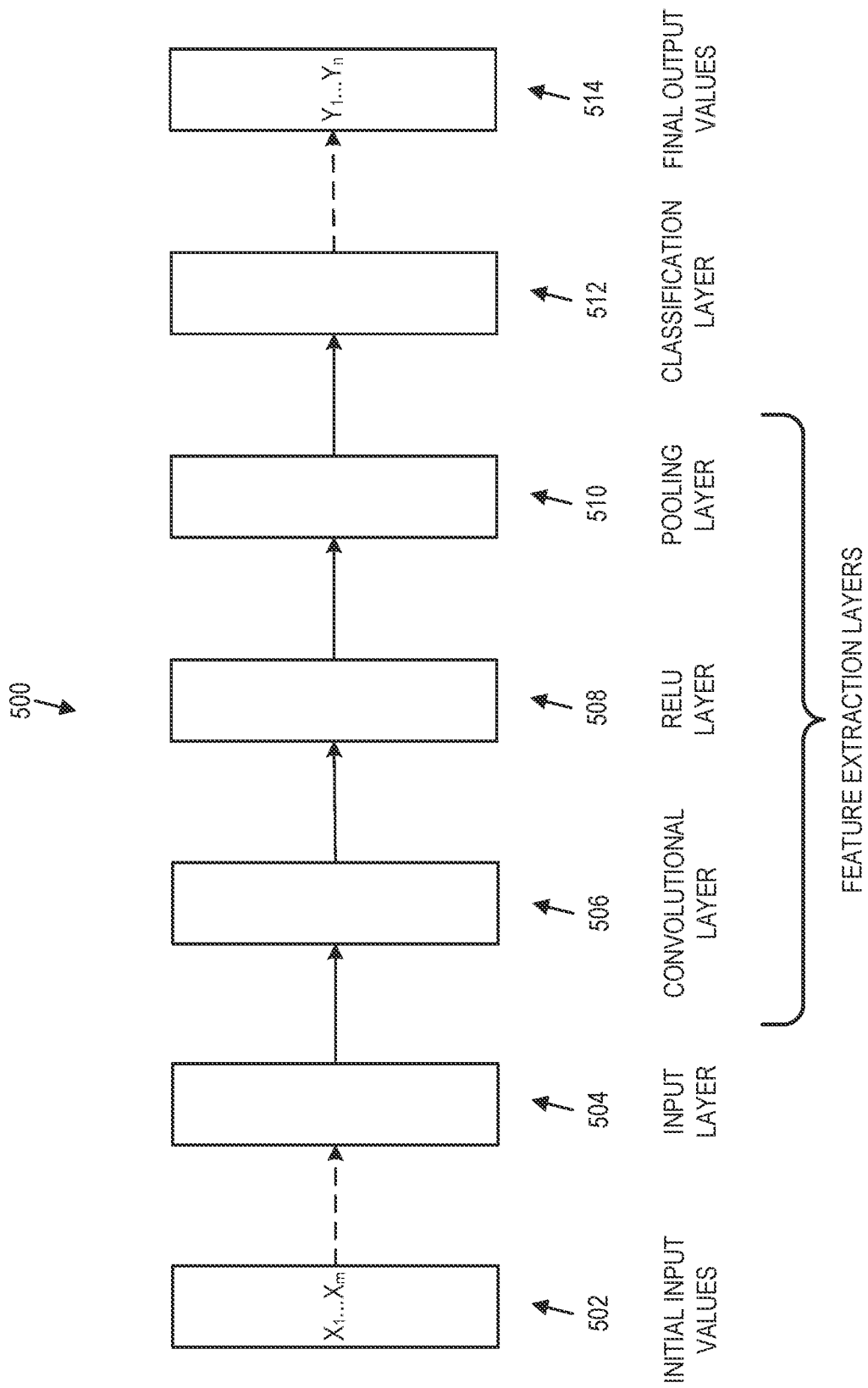
FIG. 5A depicts a convolution neural network (CNN) architecture, according to one or more example embodiments.

An example CNN 500 is shown in FIG. 5A. Initial input values 502, represented as pixels $X_1 \ldots X_m$, are provided to input layer 504. As discussed above, input layer 504 may have three dimensions based on the width, height, and number of color channels of pixels $X_1 \ldots X_m$. Input layer 504 provides values into one or more sets of feature extraction layers, each set containing an instance of convolutional layer 506, RELU layer 508, and pooling layer 510. The output of pooling layer 510 is provided to one or more classification layers 512. Final output values 514 may be arranged in a feature vector representing a concise characterization of initial input values 502.

Convolutional layer 506 may transform its input values by sliding one or more filters around the three-dimensional spatial arrangement of these input values. A filter is represented by biases applied to the nodes and the weights of the connections therebetween, and generally has a width and height less than that of the input values. The result for each filter may be a two-dimensional block of output values (referred to as a feature map) in which the width and height can have the same size as those of the input values, or one or more of these dimensions may have different size. The combination of each filter's output results in layers of feature maps in the depth dimension, in which each layer represents the output of one of the filters.

Applying the filter may involve calculating the dot-product sum between the entries in the filter and a two-dimensional depth slice of the input values. An example of this is shown in FIG. 5B. Matrix 520 represents input to a convolutional layer, and thus could be image data, for example. The convolution operation overlays filter 522 on matrix 520 to determine output 524. For instance, when filter 522 is positioned in the top left corner of matrix 520, and the dot-product sum for each entry is calculated, the result is 4. This is placed in the top left corner of output 524.

Turning back to FIG. 5A, a CNN learns filters during training such that these filters can eventually identify certain types of features at particular locations in the input values. As an example, convolutional layer 506 may include a filter that is eventually capable of detecting edges and/or colors in the image patch from which initial input values 502 were derived. A hyper-parameter called receptive field determines the number of connections between each node in convolutional layer 506 and input layer 504. This allows each node to focus on a subset of the input values.

RELU layer 508 applies an activation function to output provided by convolutional layer 506. In practice, it has been determined that the rectified linear unit (RELU) function, or a variation thereof, appears to provide strong results in CNNs. The RELU function is a simple thresholding function defined as $f(x)=\max(0, x)$. Thus, the output is 0 when x is negative, and x when x is non-negative. A smoothed, differentiable approximation to the RELU function is the softplus function. It is defined as $f(x)=\log(1+e^x)$. Nonetheless, other functions may be used in this layer.

Pooling layer 510 reduces the spatial size of the data by down-sampling each two-dimensional depth slice of output from RELU layer 508. One possible approach is to apply a 2×2 filter with a stride of 2 to each 2×2 block of the depth slices. This will reduce the width and height of each depth slice by a factor of 2, thus reducing the overall size of the data by 75%.

Classification layer 512 computes final output values 514 in the form of a feature vector. As an example, in a CNN trained to be an image classifier, each entry in the feature vector may encode a probability that the image patch contains a particular class of item (e.g., a human face, a cat, a beach, a tree, etc.).

In some embodiments, there are multiple sets of the feature extraction layers. Thus, an instance of pooling layer 510 may provide output to an instance of convolutional layer 506. Further, there may be multiple instances of convolutional layer 506 and RELU layer 508 for each instance of pooling layer 510.

CNN 500 represents a general structure that can be used in image processing. Convolutional layer 506 and classification layer 512 apply weights and biases similarly to layers in ANN 400, and these weights and biases may be updated during backpropagation so that CNN 500 can learn. On the other hand, RELU layer 508 and pooling layer 510 generally apply fixed operations and thus might not learn.

Not unlike an ANN, a CNN can include a different number of layers than is shown in the examples herein, and each of these layers may include a different number of nodes. Thus, CNN 500 is merely for illustrative purposes and should not be considered to limit the structure of a CNN.

Figure 6:
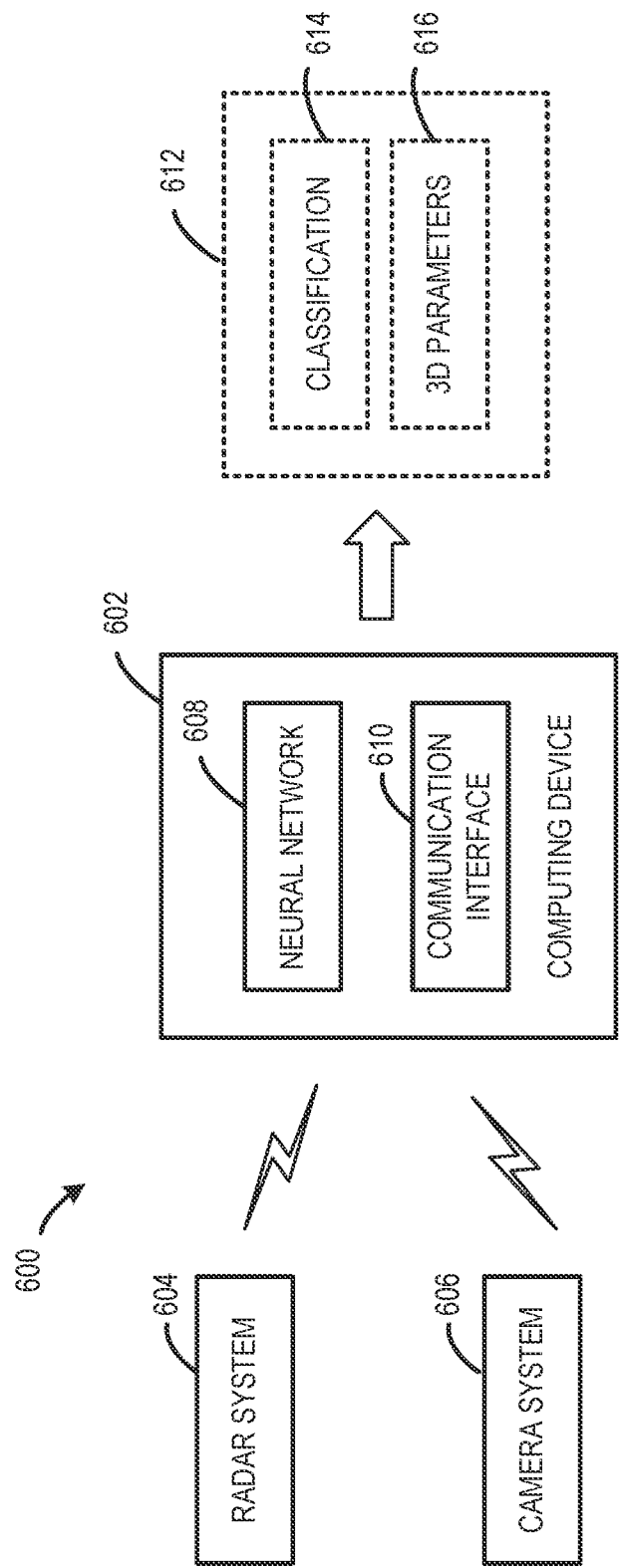
FIG. 6 depicts a system for 3D object detection and localization, according to one or more example embodiments.

FIG. 6 illustrates a system for performing 3D object detection and localization, according to one or more example embodiments. In the example embodiment, system 600 includes computing device 602, radar system 604, and camera system 606. In other embodiments, system 600 can include other components, such as other types of sensors (e.g., LIDAR).

System 600 can perform 3D object detection and localization techniques described herein. In some applications, system 600 can be used to assist with navigation of an autonomous or semi-autonomous vehicle. For instance, system 600 can provide information that can be used to enable a vehicle to navigate safely through various environments.

Computing device 602 represents one or more processing units within system 600 that can perform one or more operations described herein. For instance, computing device 602 can be configured to perform method 800 shown as a flowchart in FIG. 8. Computing device 602 may be implemented as computing system 112 of FIG. 1, computing device 300 of FIG. 3, or another type of processing device or group of devices.

In some embodiments, computing device 602 is located onboard a vehicle. By having computing device 602 onboard the vehicle, the time required for communication between components within system 600 can be reduced. In other embodiments, computing device 602 may be located physically separate from the vehicle. Computing device 602 may be positioned remotely and communicate wirelessly with one or more computing systems located onboard the vehicle.

Radar system 604 represents one or more radar units that can transmit radar signals into the environment and receive radar reflections off surfaces in the environment. Distances to radio-reflective features in the environment can then be determined according to the time delay between transmission and reception. Radar system 604 can emit a signal that varies in frequency over time, such as a signal with a time-varying frequency ramp, and then relate the difference in frequency between the emitted signal and the reflected signal to a range estimate. In some examples, radar system 604 may also estimate relative motion of reflective objects based on Doppler frequency shifts in the received reflected signals.

Directional antennas can be used by radar system 604 for the transmission and/or reception of signals to associate each range estimate with a bearing. More generally, directional antennas can also be used to focus radiated energy on a given field of view of interest. Combining the measured distances and the directional information can allow for the surrounding environment features to be mapped.

Radar system 604 can include one or more radar units having one or multiple antenna arrays, which may take the form of a single-input single-output single-input, multiple-output (SIMO), multiple-input single-output (MISO), multiple-input multiple-output (MIMO), and/or synthetic aperture radar (SAR) radar antenna architecture. In some embodiments, example radar unit architecture may include a plurality of "dual open-ended waveguide" (DOEWG) antennas. The term "DOEWG" may refer to a short section of a horizontal waveguide channel plus a vertical channel that splits into two parts. Each of the two parts of the vertical channel may include an output port configured to radiate at least a portion of electromagnetic waves that enters the radar unit. Additionally, in some instances, multiple DOEWG antennas may be arranged into one or more antenna arrays.

In some embodiments, radar system 604 may be configured to operate at an electromagnetic wave frequency in the W-Band (e.g., 77 Gigahertz (GHz)). The W-Band may correspond to electromagnetic waves on the order of millimeters (e.g., 1 mm or 4 mm). Radar system 604 may use one or more antennas that can focus radiated energy into tight beams to measure an environment with high accuracy. Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume).

Techniques presented herein can involve the use of various types of radar units and systems. Some radar systems may provide range, Doppler, and azimuth information regarding surfaces in the environment. Other radar systems may additionally provide elevation angle information for the surfaces.

Camera system 606 represents one or more cameras configured to capture images of the environment of the vehicle. A camera is an optical instrument that can be used to capture an image. Camera system 606 may include one or more cameras in various arrangements in or on the vehicle. In addition, different types of cameras can be used within camera system 606. Camera system 606 may include cameras that produce different resolutions. In addition, the field of view of cameras within camera system 606 can overlap with the field of view of radar units from radar system 604. This way, cameras and radar units can be paired together for performing techniques described herein.

In some examples, multiple cameras can overlap with one or more radar units. For instance, multiple images can be obtained depicting a portion of the environment from different camera angles and combined with radar data.

Computing device 602 can receive and process radar data and images and/or video provided by radar system 604 and camera system 606, respectively. For instance, computing device 602 may leverage communication interface 610 to obtain and provide radar data and images as inputs into neural network 608. The images can be paired with radar that covers overlapping portions of the environment. In some examples, computing device 602 may perform pre-processing techniques on the images and/or radar data prior to providing the data as inputs into neural network 608. For instance, computing device 602 may use radar measurements to crop an image or series of images into image patches that isolate a particular object or objects. The cropping may involve resizing the image patches to a uniform size specific for inputting into neural network 608.

Neural network 608 may be trained to perform operations related to 3D object detection. Computing device 602 may provide image data from camera system 606 and radar data from radar system 604 as inputs into neural network 608. Neural network 608 can use these inputs to provide output parameters 612 that convey information about objects in the surrounding environment.

In some embodiments, computing device 602 may cause a radar unit to transmit radar signals into the vehicle's environment and receive radar reflections that represent reflections of the radar signals. Computing device 602 may determine information about surfaces in the environment using the radar reflections, such as a heading and a range for various objects. The range can represent the distance between the object and the radar unit (or vehicle). Computing device 602 may also receive images from camera system 606 that depict aspects of the environment. For a given object, computing device 602 may crop an image that includes the object into an image patch that focuses upon the object with peripheral areas around the object removed. The image patch and radar measurements determined for the object (e.g., heading and range relative to the vehicle) can be provided as inputs to neural network 608, which can be trained to use these inputs to perform 3D object detection and localization techniques.

Neural network 608 can provide output parameters 612 that represent information about objects in the vehicle's environment using image data and radar data. In other examples, neural network 608 may use other types of sensor information. The other sensor information can supplement or replace the image data and/or radar data. For instance, neural network 608 can be trained to further use LIDAR data.

In the example embodiment shown in FIG. 6, output parameters 612 includes classification 614 and 3D parameters 616, which collectively provide information about one or more objects in the vehicle's environment. In other embodiments, neural network 608 can be trained to provide output parameters 612 with other information about the vehicle's environment. Classification 614 may involve assigning a class label to an object or surface in the environment. Neural network 608 can be trained to identify labels that describe the objects based on similarities that these objects share. Classification and categorization can enable neural network 608 to organize surfaces and objects encountered as the vehicle navigates and simplify the control system's understanding of the environment. Categorization is grounded in the features that distinguish the category's members from nonmembers. Objects in the vehicle's environment can differ substantially in features, which enables classification according to different categories. Some example categories can include vehicles, pedestrians, traffic signs, and roadway elements, among other possibilities. Each category can also include subcategories. For instance, the vehicle category can further include subcategories based on additional features of vehicles, such as by vehicle size, quantity of wheels, and type of vehicle, etc. Similarly, traffic signs can include different subcategories. The organization of information in a way that enables navigation decisions to be quickly determined and executed by the vehicle control system.

3D parameters 616 may enable object localization, which can involve determining a bounding box around one or more objects. 3D parameters 616 may include an indication of the dimensions for one or more objects in the vehicle's environment. The dimensions of an object may specify a topological measure of the size of the object's covering properties. The dimensions can indicate the number of coordinates needed to specify a point on the object. In some examples, the dimensions may indicate the length, width, and height of an object in the vehicle's environment. Classification 614 and 3D parameters 316 can be determined based on similar features. For instance, neural network 608 can be trained to perform classification 614 based on an object's dimensions and/or other information obtained from radar system 604 and camera system 606.

Computing device 602 or another computing system (e.g., a vehicle control system) may use output parameters 612 to determine and perform a control strategy for the vehicle. In some examples, computing device 602 may provide control instructions to a control system based on output parameters 612. The control strategy can depend on the environment and changes in the environment. As such, 3D object detection techniques can be performed iteratively to continually update the vehicle's understanding of the surrounding environment.

Example 3D object detection techniques can be performed to measure multiple portions of the surrounding environment. For example, system 600 may perform similar techniques using radar unit and camera unit pairings to enable a thorough understanding of the environment 360 degrees around the vehicle.

Figure 7:
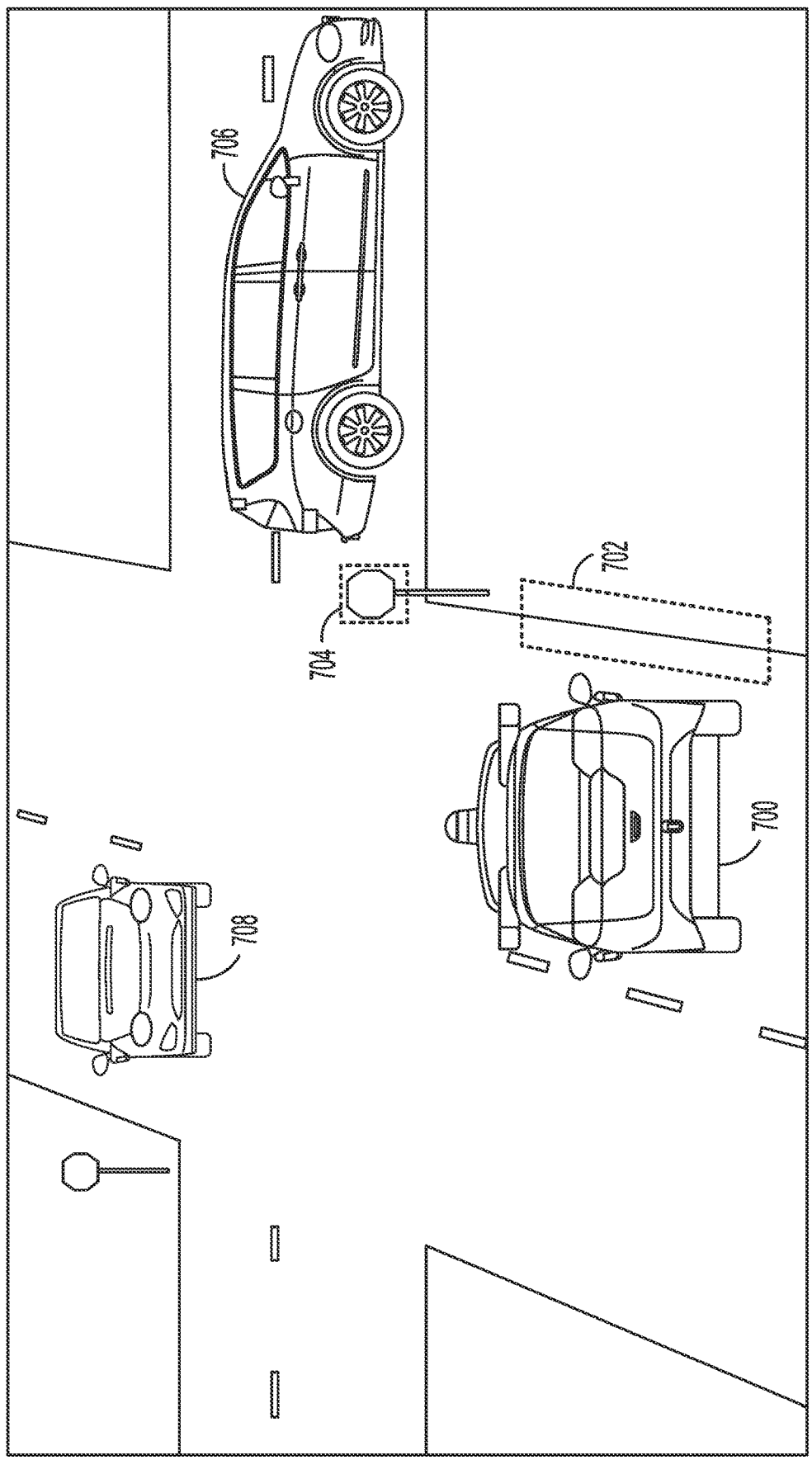
FIG. 7 depicts a vehicle performing 3D object detection and localization, according to one or more example embodiments.

FIG. 7 illustrates a scenario involving a vehicle radar system performing 3D object detection. Vehicle 700 can perform 3D object detection techniques described herein to detect various objects in the environment. The information obtained from performing 3D object detection can be used to safely navigate the environment. In some embodiments, vehicle 700 may use 3D object detection to understand the environment when transporting passengers.

In the example embodiment, vehicle 700 is using techniques described herein to detect and determine information about road boundary 702, stop sign 704, vehicle 706, and vehicle 708. For these objects as well as other surfaces in the environment, the control system may use classification and 3D parameters to safely navigate vehicle 700. By detecting and localizing objects in the environment relative to vehicle 700, the control system can determine a navigation strategy that factors road boundary 702, stop sign 704, vehicles 706-708 and information derived about these objects. The navigation strategy can specify to navigate vehicle 700 relative to road boundary 702 while also anticipating and stopping in accordance with stop sign 704. A neural network may provide outputs that enable the classification and localization of stop sign 704, which in turns causes the control system to anticipate and execute a proper stop at the intersection. The control system can also detect, identify, and navigate relative to vehicles 706-708 based on the outputs from one or more neural networks helping process sensor data, such as images and radar data.

Figure 8:
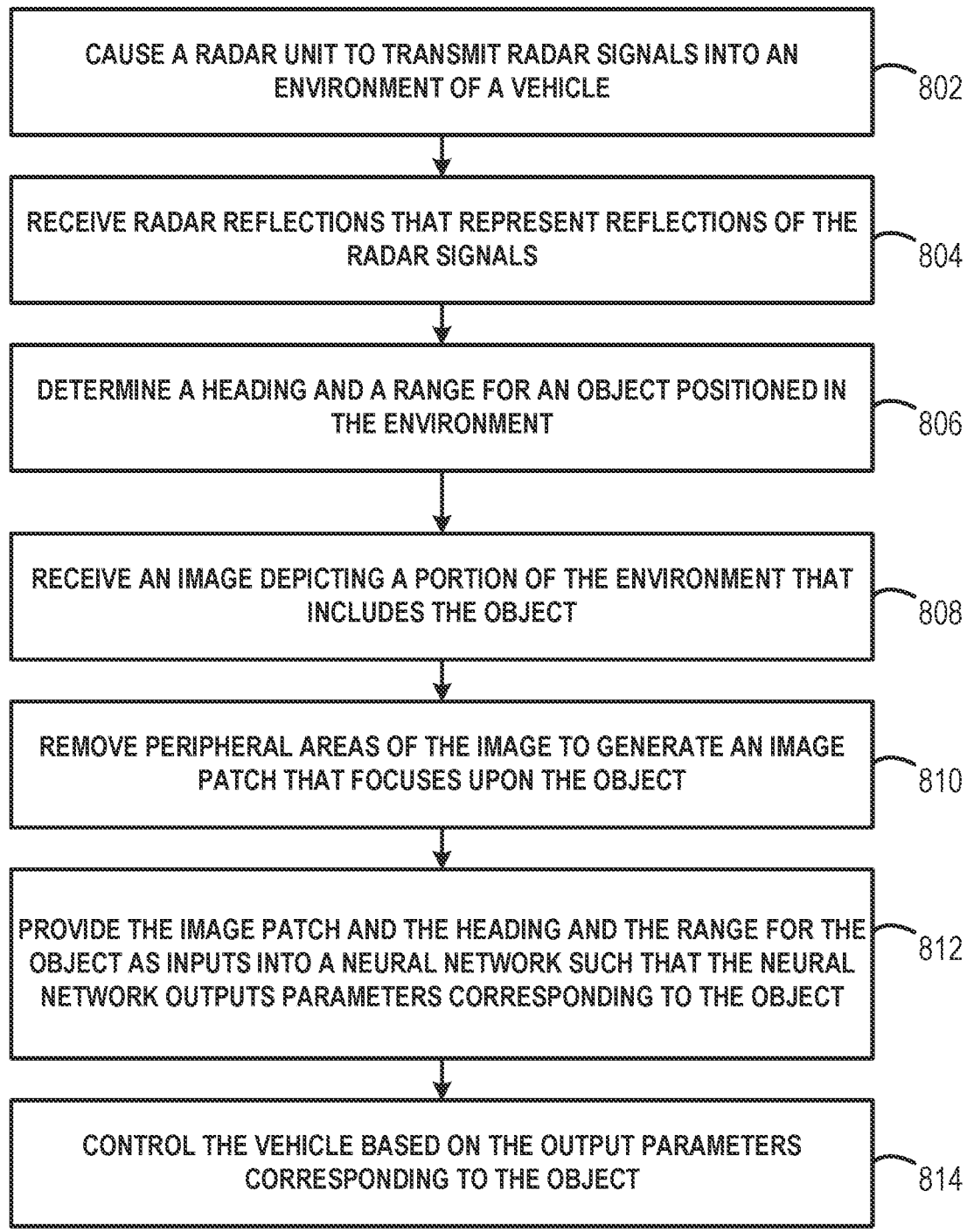
FIG. 8 is a flow chart of a method for performing 3D object detection and localization, according to example embodiments.

FIG. 8 is a flowchart of method 800 for performing 3D object detection and localization, according to one or more embodiments. Method 800 may include one or more operations, functions, or actions, as depicted by one or more of blocks 802, 804, 806, 808, 810, 812, and 814, each of which may be carried out by any of the systems shown in prior figures, among other possible systems.

Those skilled in the art will understand that the flow charts described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 802, method 800 involves causing a radar unit to transmit radar signals into an environment of a vehicle. For instance, the computing device may communicate with the vehicle radar system and cause one or more radar units to transmit radar signals into the environment as the vehicle navigates. In some examples, the computing device can operate as part of a sensor system associated with the vehicle.

At block 804, method 800 involves receiving radar reflections that represent reflections of the radar signals. One or more reception antennas from the vehicle radar system can obtain reflections of the radar signals that bounce off various surfaces in the vehicle's environment.

At block 806, method 800 involves determining a heading and a range for an object positioned in the environment of the vehicle based on the radar reflections. The computing device or another processing unit may process measurements within radar reflections to determine the heading and the range for one or more objects positioned in the vehicle's environment. The range can represent the distance between the object and the vehicle.

In some embodiments, a computing device may cause the radar unit to transmit radar signals having pulse-Doppler stretch linear frequency modulated (LFM) waveforms. For instance, the radar can transmit radar signals using an antenna array (e.g., one or more 2D arrays). As such, the computing device or another processing unit may process the radar reflections using a mixing process based on the pulse-Doppler stretch LFM waveforms to determine the heading and the range for the object positioned in the environment. Processing the radar reflections to extract measurements of the environment can involve other techniques in examples.

At block 808, method 800 involves receiving an image depicting a portion of the environment of the vehicle that includes the object. For instance, the computing device can receive the image from a vehicle camera coupled to the vehicle. The camera can be configured to capture images (or video) of a portion of the environment that overlaps with the radar measurements. As a result, the camera can capture images that include objects also detected within radar measurements.

In some embodiments, the computing device may cause the radar unit to transmit the radar signals at a first time and receive the image based on the vehicle camera capturing the image at a second time. In particular, the second time may be a threshold duration subsequent to the first time. As a result, the image can depict the object when the vehicle is at a position that is substantially similar to the position of the vehicle when the radar measurements are obtained. The threshold duration can depend on the speed of the vehicle in some instances. For instance, the threshold duration may be decreased when the vehicle is traveling at higher speeds and may be increased when the vehicle is traveling at slower speeds.

At block 810, method 800 involves removing peripheral areas of the image to generate an image patch that focuses upon the object. The computing device may remove the peripheral areas in the image to crop the image into the image patch that isolates the object based on the heading and the range for the object as represented within the radar measurements.

In some examples, the computing device (or another processing unit) may identify the object in the image based on the heading and the range for the object and determine an outline of the object based on identifying the object. The computing device may then remove peripheral areas of the image that represent portions of the environment positioned outside the outline of the object.

In some examples, the computing device can perform the cropping process to generate image patches from images having different resolutions. The computing device can be configured to crop images and resize these image patches to a uniform size prior to inputting into one or more neural networks for further analysis.

At block 812, method 800 involves providing the image patch and the heading and the range for the object as inputs into a neural network such that the neural network provides output parameters corresponding to the object. The output parameters produced by the neural network can vary within examples. For instance, the output parameters may include a classification for the object and/or 3D parameters that indicate a center of the object and a set of dimensions for the object from a perspective of the vehicle.

In some embodiments, the computing device may determine a first set of channels having a red pixel channel, a green pixel channel, and a blue pixel channel based on pixels within the image patch and determine a second set of channels having a heading channel and a range channel based on the heading and the range for the object. The computing device may then provide the first set of channels and the second set of channels as inputs into the neural network. The neural network may use the five channels to generate output channels, such as a channel indicating a classification for the object, one or more channels indicating a center of the object from the perspective of the vehicle (e.g., three channels specifying X, Y, and Z in the space), and one or more channels indicating dimensions for the object based on the perspective of the vehicle.

At block 814, method 800 involves controlling the vehicle based on the output parameters corresponding to the object. The computing device may determine a control strategy that enables the vehicle to avoid the object during subsequent navigation. The control strategy may involve a buffer associated with avoiding the object that depends at least on the classification for the object. As such, the vehicle can be controlled based on the control strategy.

In some examples, the computing device may determine that the object is a potential passenger based on the classification for the object. For instance, the computing device may identify a potential passenger based on images and use the output from the neural network to confirm this identification. Responsive to determining that the object is the potential passenger, the computing device may determine an orientation and a position of the potential passenger relative to the vehicle based on the center of the object and the set of dimensions for the object from the perspective of the vehicle as output by the neural network. As such, the computing device may then cause the vehicle to navigate at a particular speed toward the potential passenger based on the orientation the position of the potential passenger relative to the vehicle and stop the vehicle proximate the potential passenger to enable the potential passenger to enter into the vehicle.

Figure 9:
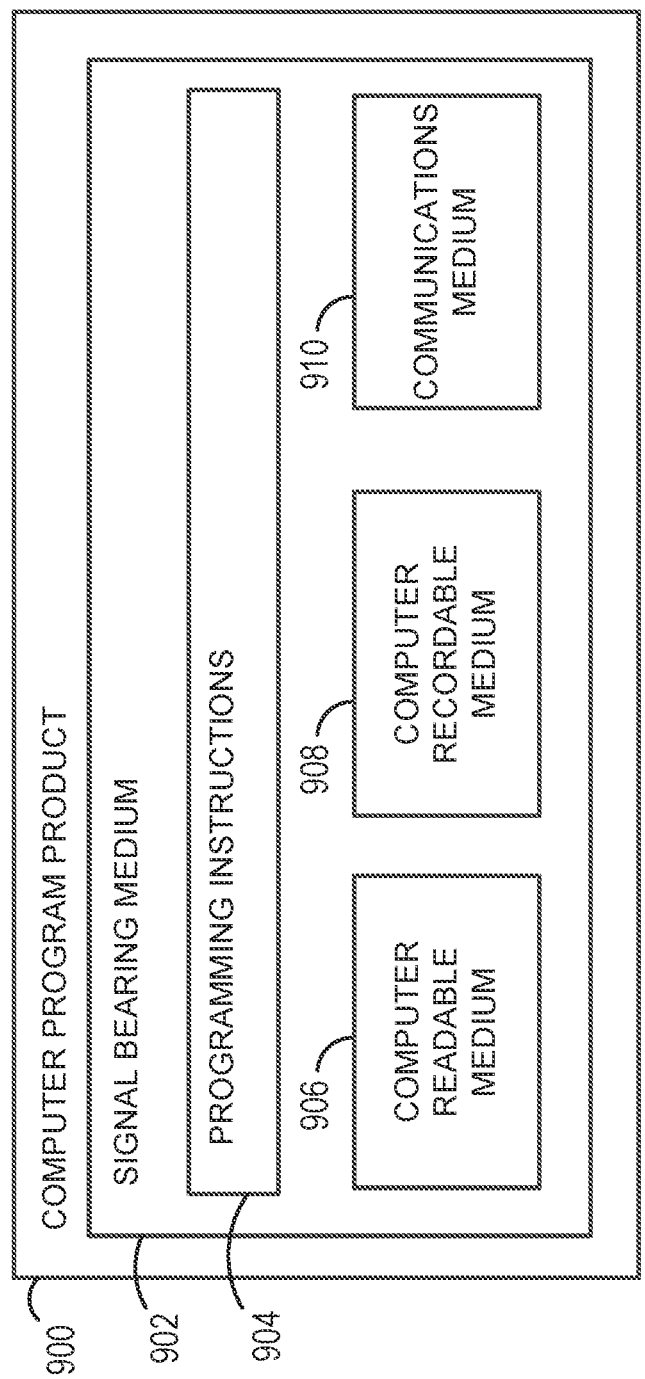
FIG. 9 is a schematic diagram of a computer program, according to example implementations.

FIG. 9 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 900 is provided using signal bearing medium 902, which may include one or more programming instructions 904 that, when executed by one or more processors may provide functionality or portions of the functionality described above with respect to FIGS. 1-8. In some examples, the signal bearing medium 902 may encompass a non-transitory computer-readable medium 906, such as, but not limited to, a hard disk drive, a Compact Disc (CD), a Digital Video Disk (DVD), a digital tape, memory, etc. In some implementations, signal bearing medium 902 may encompass computer recordable medium 908, such as, but not limited to, memory, read/write (R/W) CDs, R/W DVDs, etc. In some implementations, signal bearing medium 902 may encompass communications medium 910, such as, but not limited to, a digital and/or an analog communication medium (e.g., a fiber optic cable, a waveguide, a wired communications link, a wireless communication link, etc.). Thus, for example, signal bearing medium 902 may be conveyed by a wireless form of communications medium 910.

One or more programming instructions 904 may be, for example, computer executable and/or logic implemented instructions. In some examples, a computing device such as computer system 112 of FIG. 1 or computing device 300 of FIG. 3 may be configured to provide various operations, functions, or actions in response to the programming instructions 904 conveyed to computer system 112 by one or more of computer readable medium 906, computer recordable medium 908, and/or communications medium 910. Other devices may perform operations, functions, or actions described herein.

Non-transitory computer readable medium 906 could also be distributed among multiple data storage elements, which could be remotely located from each other. The computing device that executes some or all of the stored instructions could be a vehicle, such as vehicle 100 illustrated in FIGS. 1-2E. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
causing, by a computing system, a radar unit to transmit radar signals into an environment of a vehicle;
receiving, at the computing system, radar reflections that represent reflections of the radar signals;
based on the radar reflections, determining a heading and a range for an object positioned in the environment, wherein the range represents a distance between the object and the vehicle;
receiving, at the computing system and from a vehicle camera, an image depicting a portion of the environment that includes the object;
based on the heading and the range for the object, removing peripheral areas of the image to generate an image patch that focuses upon the object;
providing the image patch and the heading and the range for the object as inputs into a neural network such that the neural network provides output parameters corresponding to the object, wherein the output parameters indicate a classification for the object, a center of the object, and a set of dimensions for the object from a perspective of the vehicle; and
controlling the vehicle based on the output parameters corresponding to the object.

2. The method of claim 1, wherein causing the radar unit to transmit the radar signals into the environment of the vehicle comprises:
causing the radar unit to transmit radar signals having pulse-Doppler stretch linear frequency modulated (LFM) waveforms, wherein the radar unit is configured to use an antenna array to transmit the radar signals; and
wherein determining the heading and the range for the object positioned in the environment comprises:
processing the radar reflections using a mixing process based on the pulse-Doppler stretch LFM waveforms to determine the heading and the range for the object positioned in the environment.

3. The method of claim 1, wherein causing the radar unit to transmit the radar signals into the environment of the vehicle comprises:
causing the radar unit to transmit the radar signals at a first time; and
wherein receiving the image depicting the portion of the environment that includes the object comprises:
receiving the image based on the vehicle camera capturing the image at a second time, wherein the second time is a threshold duration subsequent to the first time.

4. The method of claim 1, wherein removing peripheral areas of the image to generate the image patch that focuses upon the object comprises:
identifying the object in the image based on the heading and the range for the object;
based on identifying the object, determining an outline of the object; and
removing peripheral areas of the image that represent portions of the environment outside the outline of the object.

5. The method of claim 1, wherein controlling the vehicle based on the parameters corresponding to the object comprises:
based on the classification for the object, the center of the object, and the set of dimensions for the object from the perspective of the vehicle, determining a control strategy that enables the vehicle to avoid the object during subsequent navigation, and wherein the control strategy involves a buffer associated with avoiding the object that depends at least on the classification for the object; and
controlling the vehicle based on the control strategy.

6. The method of claim 1, further comprising:
based on the classification for the object, determining that the object is a potential passenger;
responsive to determining that the object is the potential passenger, determining an orientation and a position of the potential passenger relative to the vehicle based on the center of the object and the set of dimensions for the object from the perspective of the vehicle; and
wherein controlling the vehicle based on the parameters corresponding to the object further comprises:
causing the vehicle to navigate at a particular speed toward the potential passenger based on the orientation the position of the potential passenger relative to the vehicle; and
stopping the vehicle proximate the potential passenger to enable the potential passenger to enter into the vehicle.

7. The method of claim 1, wherein providing the image patch and the heading and the range for the object as inputs into the neural network such that the neural network provides output parameters corresponding to the object comprises:
based on pixels within the image patch, determining a first set of channels having a red pixel channel, a green pixel channel, and a blue pixel channel;
based on the heading and the range for the object, determining a second set of channels having a heading channel and a range channel; and
providing the first set of channels and the second set of channels as inputs into the neural network.

8. The method of claim 1, wherein providing the image patch and the heading and the range for the object as inputs into the neural network such that the neural network provides output parameters corresponding to the object comprises:
providing the image patch and the heading and the range for the object positioned in the environment as inputs into a convolution neural network.

9. A system comprising:
a vehicle;
a radar unit coupled to the vehicle;
a vehicle camera;
a computing device configured to:
cause the radar unit to transmit radar signals into an environment of the vehicle;
receive radar reflections that represent reflections of the radar signals;
based on the radar reflections, determine a heading and a range for an object positioned in the environment, wherein the range represents a distance between the object and the vehicle;
receive, from the vehicle camera, an image depicting a portion of the environment that includes the object;
based on the heading and the range for the object, remove peripheral areas of the image to generate an image patch that focuses upon the object;
provide the image patch and the heading and the range for the object as inputs into a neural network such that the neural network provides output parameters corresponding to the object, wherein the output parameters indicate a classification for the object, a center of the object, and a set of dimensions for the object from a perspective of the vehicle; and
control the vehicle based on the output parameters corresponding to the object.

10. The system of claim 9, wherein the computing device is further configured to:
cause the radar unit to transmit the radar signals at a first time; and
receive the image based on the vehicle camera capturing the image at a second time, wherein the second time is a threshold duration subsequent to the first time.

11. The system of claim 9, wherein the computing device is further configured to:
identify the object in the image based on the heading and the range for the object;
based on identifying the object, determine an outline of the object; and
remove peripheral areas of the image that represent portions of the environment outside the outline of the object.

12. The system of claim 9, wherein the computing device is further configured to:
based on the classification for the object, the center of the object, and the set of dimensions for the object from the perspective of the vehicle, determine a control strategy that enables the vehicle to avoid the object during subsequent navigation, and wherein the control strategy involves a buffer associated with avoiding the object that depends at least on the classification for the object; and
control the vehicle based on the control strategy.

13. The system of claim 12, wherein the computing device is further configured to:
based on the classification for the object, determine that the object is a potential passenger;
responsive to determining that the object is the potential passenger, determine an orientation and a position of the potential passenger relative to the vehicle based on the center for the object and the set of dimensions for the object from the perspective of the vehicle;
cause the vehicle to navigate at a particular speed toward the potential passenger based on the orientation the position of the potential passenger relative to the vehicle; and
stop the vehicle proximate the potential passenger to enable the potential passenger to enter into the vehicle.

14. The system of claim 9, wherein the neural network is a convolution neural network.

15. A non-transitory computer-readable medium configured to store instructions, that when executed by a computing system comprising one or more processors, causes the computing system to perform operations comprising:
causing a radar unit to transmit radar signals into an environment of a vehicle;
receiving radar reflections that represent reflections of the radar signals;
based on the radar reflections, determining a heading and a range for an object positioned in the environment, wherein the range represents a distance between the object and the vehicle;
receiving, from a vehicle camera, an image depicting a portion of the environment that includes the object;
based on the heading and the range for the object, removing peripheral areas of the image to generate an image patch that focuses upon the object;
providing the image patch and the heading and the range for the object as inputs into a neural network such that the neural network provides output parameters corresponding to the object, wherein the output parameters indicate a classification for the object, a center of the object, and a set of dimensions for the object from a perspective of the vehicle; and
providing control instructions for the vehicle based on the output parameters corresponding to the object.

* * * * *